Patented Sept. 17, 1940

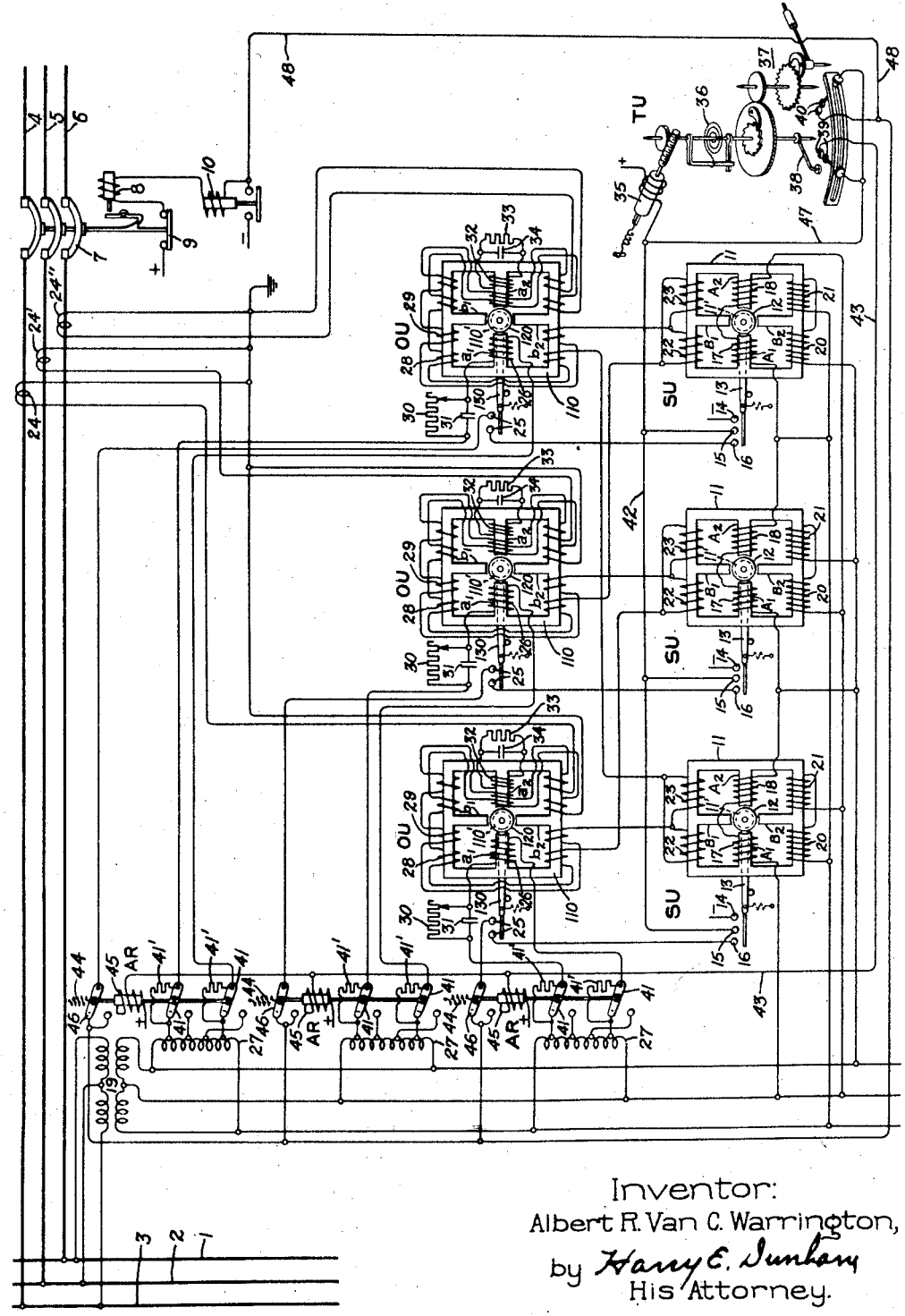

2,214,867

UNITED STATES PATENT OFFICE 2,214,867

PROTECTIVE APPARATUS

Albert R. van C. Warrington, Wallingford, Pa., assignor to General Electric Company, a corporation of New York Original application September 7, 1938, Serial No. 228,755. Divided and this application June 23, 1939, Serial No. 280,857

5 Claims. (Cl. 175—294)

My invention relates to improvements in protective apparatus and more particularly protective relays and especially relays of the distance responsive type. One object of my invention is to provide a polyphase distance responsive relay which involves a minimum of units which can be compactly assembled without danger of such interference between the fluxes of the magnetic elements as to cause improper operation. Another object of my invention is to provide an improved directionally responsive type of starting unit in which the magnetic forces are so correlated as to insure the correct directional response even in case of severe faults with low voltage and a high current. These and other objects of my invention will hereinafter appear in more detail.

This application is a division of my copending application Serial No. 228,755, filed September 7, 1938, and assigned to the assignee of this application.

My invention will be better understood from the following description when considered in connection with the accompanying drawing, and its scope will be pointed out in the appended claims.

The single figure of the accompanying drawing diagrammatically illustrates an embodiment of my invention in a polyphase distance relay as applied to a three-phase alternating current system. As shown, the system comprises busses 1, 2, 3 and a line having phase conductors 4, 5, 6 leading therefrom through suitable circuit interrupting means such as a latch-closed circuit breaker 7. This circuit breaker is shown as provided with a strip coil 8 and an "a" auxiliary switch 9 which is closed when the circuit breaker is closed and open when the circuit breaker is open. The circuit of the trip coil may include a seal-in relay 10 to by-pass the more delicate protective relay contacts and to insure a definitely maintained energization of the trip coil once the protective relay contacts have operated to initiate its energization.

In the illustrated embodiment of my invention which shows a three-phase relay for protecting against phase-to-phase faults, three-phase faults and double phase-to-ground faults on a three-phase system, I provide a starting unit SU, an ohm unit OU, and an auxiliary relay AR for each phase, and a common timing unit TU. For protection against single phase-to-ground faults, another like equipment will be provided except for the current and voltage connections which, as will be obvious to those skilled in the art, would involve line-to-ground voltages and single line conductor currents instead of the delta currents and voltages shown.

The structure of the starting unit SU may be of the type disclosed in U. S. Letters Patent 2,110,686, issued March 8, 1938, and, as shown schematically, comprises a hollow magnetic stator 11 having two angularly displaced pairs of inwardly projecting salients $A_1$, $A_2$ and $B_1$, $B_2$. Centrally positioned relatively to and spaced from the ends of these salients is a magnetic member or stator 11', as described in said Letters Patent and shown in dotted line since it is covered by a rotor 12 of electric current-conducting material which, is the form of a generally cylindrical cup, is mounted to rotate in the gaps between the central stator and the ends of the sailents. A contact-controlling member 13, movable with the cup 12, is arranged to control contacts 14, 15 and 16 which cooperate in the control of the energization of the trip coil 8 and also in the control of the timing unit and the associated phase auxiliary relay.

In order to secure the desired directional action or response to the direction of fault power flow, the starting unit has an operating characteristic of the form $K_1E_1If(\phi) - K_2E_1E_2f(\theta)$ or, in other words, a power directional torque opposed by a voltage restraint torque, $K_1$ and $K_2$ being constants, $E_1$ and $E_2$ voltages, and $I$ a current of the circuit $f(\phi)$ a function of the phase angle between $E$ and $I$, and $f(\theta)$ a function of the phase angle between $E_1$ and $E_2$. Thus, referring to the starting unit on the left, the salients $A_1$ and $A_2$ are provided with windings 17, 18 connected in series to be energized by the voltage between busses 2 and 1 as derived from a potential transformer 19. This voltage corresponds to the voltage between the phase conductors 5 and 6 of the circuit under protection. The windings 17, 18 are so arranged as to provide a flux in the same direction across the gap between the ends of the salients $A_1$ and $A_2$. On the stator 11 on opposite sides of the salient $B_2$ there are windings 20 and 21 respectively, connected in series to be energized by the voltage between the busses 3 and 2 and so arranged that both windings produce flux in the same direction in the salient $B_2$. The flux of the windings 20 and 21 thus cooperates with the flux of the windings 17 and 18 to provide a torque on the rotor 12 which is proportional to the product of the voltages energizing these windings and a function of the phase-angle between these voltages.

In order to obtain the desired power directional torque, the stator 11 is provided with current windings 22, 23. Inasmuch as it is necessary to obtain reliable directional action even on faults close to the bus causing heavy currents at low voltage, it is necessary to eliminate any torques due to current alone in consequence of any dissymmetry in the distribution of flux from the current salient $B_1$. The effect of any such dissymmetry in the flux may be considered as a cross flux flowing between the salients $A_1$, $A_2$ which are at right angles to the salient $B_1$. This cross flux would react with the flux in the salient $B_1$ to produce an unwanted torque. In order to eliminate this undesirable torque, the current windings 22 and 23 are placed on opposite sides of the salient $B_1$ and each has substantially the same number of turns so that, when energized by the same alternating current quantity, each develops substantially the same magnetomotive force to produce substantially the same flux between the salient $B_1$ and each of the salients $A_1$ and $A_2$. Further to achieve this purpose, these windings are connected in parallel so that they have the same voltage across them and since their turns and voltage are the same, their fluxes are the same. Consequently there will be no dissymmetry in the distribution of flux from the current salient $B_1$ or no apparent cross flux effect between the salients $A_1$ and $A_2$. In the case of the starting unit at the left, these windings 22 and 23 are connected in circuit with the secondary of the current transformer 24 in the conductor 4.

The structure of the ohm unit OU may also be of the type disclosed in U. S. Letters Patent 2,110,686 and, as shown, schematically comprises a hollow magnetic stator 110 having two angularly displaced pairs of inwardly projecting salients $a_1$, $a_2$ and $b_1$, $b_2$. Centrally positioned relatively to and spaced from the ends of these salients is a magnetic member or stator 110' as described in said Letters Patent and shown in dotted line since it is covered by a rotor 120 of electric current-conducting material which, in the form of a generally cylindrical cup, is mounted to rotate in the gaps between the central stator and the ends of the salients. A contact-controlling member 130, movable with the cup 120, is arranged to control contacts 25 which cooperate in the control of the energization of the trip coil 8.

In order to secure the desired ohmic response or distance measuring action, the ohm unit OU has an operating characteristic of the form $K_3I^2 - K_4EIf_1(\phi)$, where $K_3$ and $K_4$ are constants, E and I respectively a voltage and a current derived from the circuit, and $f_1(\phi)$ a function of the phase angle between them. This will be a sine function if distance response to the reactance of the circuit is desired. Thus, referring to the ohm unit on the left, the salient $a_1$ is provided with a winding 26 connected to be energized in accordance with the voltage between the busses 2 and 3 as derived from the potential transformer 19 and through a variable tap auto-transformer 27. On the stator 110 on each side of the salients $b_1$ and $b_2$ are current windings 28 and 29 which are respectively connected to be energized in accordance with two different line conductor currents, viz., the currents in line conductors 5 and 4 respectively. The connections to the current transformers 24 and 24' are such that one of the current energized windings has current from one phase and the other winding from the next lagging phase reversed so as to produce a flux proportional to the delta sum of the two currents. This arrangement eliminates the necessity for auxiliary Y-delta current transformers which would otherwise be required to insure the same distance measurement of the ohm units on three-phase, phase-to-phase and double ground faults and yet permits the current transformers to be in the standard Y connection. In order to insure correct distance response in case of three-phase faults, each of the windings 28 and 29 is preferably divided so that there are equal amounts on each side of each of the salients $b_1$, $b_2$. This arrangement minimizes cross flux in the salients $a_1$, $a_2$ which would add to the $I^2$ torque thus necessitating an extra compensating adjustment to make different ohm units have the same calibration. The potential winding 26 and the current windings 28 and 29 provide the EI torque.

Further, in order to have the desired $f(\phi)$ or sine function as well as to satisfy other conditions, I connect in series with the potential winding 26 a resistance 30 and a condenser 31. These are so proportioned with respect to the inductance of the potential circuit as to have this circuit resonant at unity power factor in order to enable the unit to respond only to the reactive component of the ohmic measurement, and further to make the potential circuit dead-beat so as to prevent incorrect operation in the event of sudden changes in the line voltage when a fault occurs and also to make the current in the potential circuit at a given voltage of such a value as to cause the unit to operate at a desired ohmic value. These three conditions can readily be fulfilled because there are three variables involved in three independent equations as disclosed in United States Letters Patent 2,131,608, dated September 27, 1938, and assigned to the same assignee as this invention.

In order to obtain the desired $I^2$ torque, the windings 28 and 29 are also arranged with the necessary number of turns on the salient $a_2$ to provide a current flux which cooperates with the current flux between the salients $b_1$ and $b_2$. Since these two fluxes are in phase, I provide a phase-shifting winding 32 on the salient $a_2$ and connect in circuit therewith the parallel connected resistance 33 and condenser 34. Here again, relatively to the inductance of the circuit of the winding 32, the resistance 33 and condenser 34 are so proportioned that the flux in the salient $a_2$ is shifted a suitable amount to obtain adequate torque from the interaction of the flux of salient $a_2$ with the current flux between the salients $b_1$ and $b_2$ and further so that the ohmic response may not vary over a large range of current due to local saturation and so that this circuit may also be critically damped to prevent incorrect operation due to sudden changes in current or voltage consequent upon system transients.

In order to obtain a compact arrangement of the various units, the ohm and starting units are arranged generally with their stators 110 and 11 in parallel planes one above the other although in the drawing they are shown schematically with the stators shown revolved into the same plane.

In consequence of the nearness of their magnetic fields, it is necessary to insure that the relative positions of the stators do not introduce further bias torques in consequence of fluxes fringing or leaking from the poles of some salients on one stator in such a manner as to induce potentials on the windings of another stator. Thus for example, I so arrange the starting unit that the potential salients $A_1$, $A_2$ are angularly displaced with respect to the current salients $b_1$, $b_2$ of the ohm unit so that the leakage flux from the current salients will not induce a potential in the directional voltage windings 17, 18 of the starting unit and thereby tend to cause erroneous action at low voltage with high currents. As a matter of practical construction and arrangement of the parts, the salients $b_1$, $b_2$ of the ohm unit are at right angles to the salients $A_1$, $A_2$ of the starting unit.

In order to provide a stepped time-distance characteristic such that the circuit breaker 7 may be tripped substantially instantaneously for all faults within the section of the circuit 4, 5, 6 between the busses 1, 2, 3 and the next adjacent section for all faults up to a given percentage of length, for example 90% of the protected line section extending from the busses 1, 2 and 3 and a time delay tripping for faults beyond this point and over a predetermined range of distance in the next section, and a still greater time limit for tripping to take care of conditions which may arise due to failure of some particular relay, I provide a timing unit TU and means such as the auxiliary relays AR for automatically varying the reactance setting of the ohm unit. As shown, the timing unit includes an electromagnetic motor unit 35 which, when energized, stores energy in a spring 36. This energy is released through an escapement mechanism 37 to actuate a movable contact 38 to engage different sets of adjustably positioned contacts 39, 40 after a time delay dependent upon the positioning of these contacts and the initial position of the movable contact 38. The auxiliary relays AR, through their movable contacts 41, change the ohmic setting of the ohm unit by varying the tap connections of the auto-transformer 27 and thus changing the voltage on the voltage winding 26 so that with only one ohm unit at least two reactance settings may be provided.

In order, particularly with high speed relays, to avoid any possibility of false operation in consequence of the ohm unit being without potential during the movement of the contacts 41 from one position to the other, I may connect resistances 41' across these contacts in their normally closed position. Thus these resistances are normally short-circuited but, during the intermediate or second zone setting, they do not constitute enough extra load on the transformer 27 to impair its accuracy. During the transfer period, the resistances 41' reduce the potential on the ohm unit by a predetermined amount so as to obtain a smooth transition from the initial zone setting to the intermediate or second zone setting. The fact that the ohm unit potential circuit is at unity power factor makes it possible to use these resistances.

In order to minimize the possibility of incorrect tripping in consequence of an artificial reduction in the circuit reactance due to an oscillatory condition on the power system, I may arrange the starting and timing units and the auxiliary relay to control the ohmic setting of the ohm unit so as momentarily to decrease the ohmic setting of the ohm unit a predetermined time after the response of the starting unit. For this purpose, the contacts 14 and 15 of each of the starting units are connected in parallel in the circuit 42 of the winding of the timing unit motor element 35 and also in parallel in the circuit of the windings of the auxiliary relays through the contacts 38, 39 of the timing unit in series and the conductor 43. Each auxiliary relay is provided with the necessary circuit restoring means such as a spring 44 which returns the contacts 41 to the initial ohmic setting when the winding of the auxiliary relay is deenergized. Since the timing unit contacts 39 are closed only momentarily, it may be desirable to provide a short time delay in the auxiliary relay which can be obtained by the use of suitable means such as a short-circuited winding 45.

With this arrangement each ohmic setting is assured only for the period during which the moving contact of the timing unit is touching the corresponding stationary contact. When it leaves the contact the ohm unit is returned to its original setting which reduces its zone of operation. In this way the back-up zone or zones of protection will only be available for short periods (long enough to allow tripping) and, during the majority of the times, the setting will be on the first or shortest zone, which makes the relay less liable to trip on power swings.

The usual arrangement of distance relays is to have the ohm unit continue on a given ohmic setting until changed to the next one and staying on that one until the next change. As will be apparent to those skilled in the art, this stepped time-distance characteristic can also be obtained by providing contacts on the auxiliary relay AR for each step to seal it in so that it may stay in the operated position after the timing unit contact has passed by the contact corresponding to a given ohmic setting.

Assuming the parts positioned, as shown in the drawing, and that a fault occurs on the circuit 4, 5, 6 between the phase conductors 5 and 4 within the instantaneous tripping zone range, then the circuit controlling members 13 of the starting unit on the left and 130 of the ohm unit on the left close their respective contacts 14—16 and 25 thus completing the circuit of the trip coil 8 and the seal-in relay 10 through the upper closed contact 46 of the auxiliary relay whereby to effect the energization of the trip coil and the opening of the circuit breaker.

If the fault is beyond the instantaneous zone of the circuit, then the reactance of the circuit to the fault is too high for the ohm unit to close its contacts. Inasmuch, however, as the starting unit on the left is operated, the timing unit after a predetermined time closes its contacts 39 whereby, in conjunction with the starting unit on the left, to complete the circuits of the auxiliary relays. The auxiliary relay associated with the ohm unit on the left closes its lower contacts whereby to decrease the voltage on the winding 26 of the ohm unit and thus render this unit more sensitive so that it reaches out, so to speak, farther on the line. If the ohm unit responds, then the circuit of the trip coil 8 and the seal-in relay 10 is completed through the contacts 14—16 of the starting unit on the left and the contacts 25 of the ohm unit on the left and the contact member 46 of the auxiliary relay associated with this ohm unit. If the ohm unit does not respond before the contacts 39 of the timing unit are opened and the auxiliary relay returns to the position shown in the drawing, then the initial ohmic setting of the ohm unit is restored.

If the fault is beyond an intermediate zone so that the circuit reactance to the fault is too high, the ohm unit contacts remain open even with a more sensitive setting and the starting unit contacts remain closed until the movable contact 38 of the timing unit TU engages contacts 40, when the circuit of the trip coil 8 and the seal-in relay will be completed through the contacts 14, 15 from the starting unit on the left, conductor 42, conductor 47, circuit-controlling member 38 and contacts 40, conductor 48, seal-in relay 10, trip coil 8 and circuit breaker auxiliary switch 9. Thus if a relay in any section fails to trip instantaneously or in intermediate time, then the relay in the adjacent section will operate in the back up time to disconnect its own section and thereby separate the faulty section from the system at that end.

While I have described the operation for a phase-to-phase fault on only one phase of a line, the operation for other phase-to-phase and double ground faults will be apparent from the foregoing description.

Although I have shown and described my invention as applied to the protection of three-phase systems against phase-to-phase and double ground faults, its application is not so limited. Thus my invention may be used for protection against single phase to ground faults by using Y instead of delta voltages on the potential circuits of the relay units and the differences between the line and residual currents in proper proportions in the current circuits of the relay units as will be obvious to those skilled in the art. Also the same relay can be used for both phase and ground faults by embodying the principles of transfer switching disclosed, for example, in United States Letters Patent 1,573,624, issued February 16, 1926.

While I have shown and described my invention in considerable detail, I do not desire to be limited to the exact arrangement shown but seek to cover in the appended claims all those modifications that fall within the true spirit and scope of my invention.

What I claim as new and desire to secure by Letters Patent of the United States is:

1. In a relay comprising a magnetic stator having at least three inwardly projecting salients and a rotor having an electric current conducting path mounted for movement intermediate the ends of said salients, two parallel connected windings on the body of said stator, respectively disposed on opposite sides of one of said salients, each of said windings having substantially the same number of turns so that when energized by a given electric current quantity each develops substantially the same magnetomotive force to produce substantially the same flux from the salient between said two windings to each of the other salients whereby to prevent any torque on said rotor by reason of the fluxes induced by said two windings alone and said windings being arranged on said stator to produce cumulative fluxes in said one salient.

2. In an alternating current relay comprising a magnetic stator having two angularly displaced pairs of oppositely disposed inwardly projecting salients, a magnetic member centrally positioned relatively to and spaced from the ends of said salients, and a rotor having a closed electric current conducting path mounted for movement between the magnetic member and the ends of said salients, two parallel connected windings on the body of said stator, respectively disposed on opposite sides of one of said salients, each of said windings having substantially the same number of turns so that when energized by the same alternating current quantity each develops substantially the same magnetomotive force to produce substantially the same flux from the salient between said two windings to each salient of the other pair whereby to prevent any torque on said rotor by reason of the fluxes induced by said two windings alone and said windings being arranged on said stator to produce cumulative fluxes in said one salient.

3. In a protective relay adapted for use in an alternating current circuit and having an operating characteristic of the form $K_1E_1If(\phi) - K_2E_1E_2$, where $K_1$ and $K_2$ are constants, $E_1$, $E_2$ voltages and I a current derived from the circuit, and $f(\phi)$ a function of the phase angle between $E_1$ and I, a hollow magnetic stator comprising two angularly displaced pairs of oppositely disposed inwardly projecting salients $A_1$, $A_2$ and $B_1$, $B_2$, a magnetic member centrally positioned relatively to and spaced from the inner ends of said salients, a rotor comprising a closed electric current conducting path mounted for movement in the gaps between said central magnetic member and the ends of said salients, two windings, one on each salient $A_1$ and $A_2$ of one pair of salients connected to be energized in accordance with the voltage $E_1$ so as to produce a flux across the ends of the salients $A_1$ and $A_2$, two windings on said stator, one on each side of one of the salients $B_2$ of the other pair of said salients connected to be energized in accordance with the voltage $E_2$ so as jointly to produce a flux across the end of said salient $B_2$ and the ends of the salients $A_1$ and $A_2$, and two windings on said hollow stator, one on each side of the other salient $B_1$ of said other pair connected in parallel for energization by the current I, each of said current windings having substantially the same number of turns so that each develops substantially the same magnetomotive force to produce substantially the same flux from the salient $B_2$ to each of the salients $A_1$ and $A_2$ whereby to prevent any $I^2$ torque on said rotor by reason of the fluxes of said two current windings alone.

4. In a protective relay adapted for use in an alternating current circuit and having an operating characteristic of the form $K_1E_1If(\phi) - K_2E_1E_2$, where $K_1$ and $K_2$ are constants, $E_1$, $E_2$ voltages and I a current derived from the circuit $f(\phi)$ a function of the phase angle between $E_1$ and I, a hollow magnetic stator comprising two angularly displaced pairs of oppositely disposed inwardly projecting salients, a magnetic member centrally positioned relatively to and spaced from the inner ends of said salients, a rotor comprising a closed electric current conducting path mounted for movement in the gaps between said central magnetic member and the ends of said salients, windings on one pair of said salients and on said stator adapted when energized in accordance with the voltages $E_1$ and $E_2$ respectively to exert a torque $K_2E_1E_2$ on said rotor, windings on said stator one on each side of one of the salients of the other pair of salients connected in parallel and adapted when energized by the current I to cooperate with the voltage energized windings on the other salients to exert a torque $K_1E_1If(\phi)$, each of said current windings having substantially the same number of turns so that each develops substantially the same magnetomotive force to produce substantially the same flux from the salient between them to each of the salients whose windings are energized by the voltage $E_1$ whereby to prevent any $I^2$ torque on said rotor by reason of the fluxes of said two current windings alone.

5. A relay comprising a magnetic stator having at least three inwardly projecting salients and forming two magnetic paths to which one of said salients is common and one path including one of the remaining salients and the other path including the other remaining salient, a rotor having an electric current conducting path mounted for movement adjacent the ends of said salients, and two parallel connected windings having the same number of turns and so positioned and arranged on the body of said stator as to produce in each of said magnetic paths when energized by the same voltage substantially equal fluxes which are cumulative in said common salient whereby to prevent any cross flux in the remaining two salients.

ALBERT R. van C. WARRINGTON.